United States Patent [19]
Goretzki et al.

[11] Patent Number: 6,094,020
[45] Date of Patent: Jul. 25, 2000

[54] DISK DRIVE UTILIZING BEMF OF SPINDLE MOTOR TO INCREASE VCM VOLTAGE DURING SEEKS

[75] Inventors: Jerome A. Goretzki; Hakam D. Hussein, both of Rochester, Minn.

[73] Assignee: Western Digital Corporation, Irvine, Calif.

[21] Appl. No.: 09/193,891

[22] Filed: Nov. 18, 1998

[51] Int. Cl.$^7$ ................... H02P 1/54; H02J 3/30; G11B 7/00; G11B 21/02

[52] U.S. Cl. ................... 318/109; 318/139; 318/161; 318/442; 318/500; 318/590; 360/75; 369/44.27; 307/45; 307/47

[58] Field of Search ................... 318/105–109, 318/139, 161, 440–442, 492, 500, 501, 504, 530, 590; 369/43, 44.29, 44.35, 44.36; 307/43–48, 75, 76; 360/75

[56] References Cited

U.S. PATENT DOCUMENTS

| | | | |
|---|---|---|---|
| 4,371,903 | 2/1983 | Lewis | 360/75 |
| 5,455,496 | 10/1995 | Williams et al. | 318/563 |
| 5,473,238 | 12/1995 | Latham, II et al. | 318/560 |
| 5,495,372 | 2/1996 | Bahlmann et al. | |
| 5,504,402 | 4/1996 | Menegoli | |
| 5,729,399 | 3/1998 | Albrecht et al. | 360/75 |
| 5,737,144 | 4/1998 | Ataee et al. | |
| 5,889,629 | 3/1999 | Patton, III | 360/75 |
| 5,965,992 | 10/1999 | Goretzki et al. | 318/254 |

*Primary Examiner*—Brian Sircus
*Attorney, Agent, or Firm*—Milad G. Shara

[57] ABSTRACT

A disk drive is connectable to a power supply having a fixed DC voltage. The disk drive includes a voice coil motor (VCM) and a spindle motor having a plurality of windings and a rotor rotatable at a variable spin-rate. A spindle motor driver is coupled to the fixed DC voltage and at least one of the windings for controlling the spin-rate of the rotor. The rotor has permanent magnets that induce an AC voltage across the windings while the rotor is rotating. A rectifier circuit rectifies the AC voltage across at least one of the windings to produce a rectified DC voltage. A first switch provides the rectified DC voltage to a first node. A second switch provides the fixed DC voltage to the first node. The first node has a first node DC voltage that is determined by the rectified DC voltage provided by the first switch and the fixed DC voltage provided by the second switch. The first node DC voltage is greater than the fixed DC voltage during a track seeking operation in the disk drive. A VCM driver includes switching elements that selectively provide the first node DC voltage to the VCM. The increased VCM voltage allows faster access times and more efficient VCM operation.

15 Claims, 3 Drawing Sheets

DISK DRIVE UTILIZING BEMF OF SPINDLE MOTOR TO INCREASE VCM VOLTAGE DURING SEEKS

CROSS-REFERENCE TO RELATED PATENT APPLICATION

This patent application relates to commonly assigned patent application Ser. No. 09/108,597 entitled "Faster Access Time in Disk Drive by Utilizing Increased VCM Potential Voltage" filed on Jul. 1, 1998, which is herein incorporated by reference.

BACKGROUND OF THE INVENTION

1. Field of the Invention

The present invention generally relates to reducing data access time in disk drives. More particularly, the present invention relates to reducing seek times in a disk drive by utilizing a Bemf of a spindle motor of the disk drive to increase a voltage supplied to a voice coil motor (VCM) of the disk drive.

2. Description of the Prior Art

In hard disk drives, data is stored on magnetic media disks in concentric data tracks, which are divided into groups of data sectors. Servo information including track number, sector number, and tracking information is recorded in radially continuous narrow wedges between the groups of data sectors. The disk drive includes an actuator assembly having a voice coil motor (VCM), an actuator arm extending from the VCM, and a transducer head disposed at the end of the actuator arm. One way of improving disk drive performance is to reduce data access time, including the time required to move the transducer head of the actuator assembly from a current data track to a selected target data track.

The disk drive performs a seek operation to move the transducer head from a present data track to a target data track. The disk drive includes a servo system employed to seek to the target data track and thereafter follow the target data track on the disk. The servo system controls the VCM so that the VCM swings the actuator and its attached transducer head to access the target data track. Therefore, if the torque developed ($T_d$) by the VCM could be increased, a corresponding reduction in data access time could be achieved. $T_d$ is given by the following Equations I:

Equations I $$T_d = Kt * I_{coil}$$

Kt=Ke (Kt in Nm/A; Ke in V/rad/sec)

$$Bemf = Ke * Vel_{motor} \; (Vel_{motor} \text{ in rad/sec})$$

$$V_{applied} = V_{source} - Bemf = I_{coil} * R_t$$

$$I_{coil} = (V_{source} - Ke * Vel_{motor}) R_t$$

Where:
$T_d$ is the torque developed by the VCM;
Kt is the Torque constant of the VCM;
$I_{coil}$ is VCM coil current;
Ke is the Voltage constant of the VCM (i.e. the Bemf factor);
Bemf is the back emf of the VCM;
$Vel_{motor}$ is the velocity of the VCM;
$V_{applied}$ is the voltage applied to the VCM coil;
$V_{source}$ is the voltage of the VCM power source supplying power to the VCM; and
$R_t$ is the total resistance of the VCM coil and the power FETs driving the VCM coil from the VCM power source to ground As can be shown by Equations I above, $T_d$ can be increased by increasing Kt and/or $I_{coil}$. Unfortunately, increasing $I_{coil}$ causes a corresponding heating of the VCM coil, proportional to the square of the current, which can result in heat related breakdown of VCM components, including the VCM coil itself In particular, seek operations require the highest current to be supplied to the VCM in order to achieve competitive access times. Conversely, increasing Kt equates to an equal increase in Ke which increases the Bemf of the VCM. Therefore, the Bemf approaches $V_{source}$ as Kt is increased. Consequently, if $V_{source}$ cannot be increased, less voltage $V_{applied}$ is available and $I_{coil}$ is reduced as Kt is increased thereby limiting the performance of the VCM. The $V_{source}$ supplied to the VCM in disk drives, however, is fixed because, for compatibility with host systems, a standard power supply having a fixed voltage is used to supply power to the VCM. This fixed voltage power supply to the VCM therefore limits how much effect the VCM can have on reducing access times.

For reasons stated above, there is a desire to reduce data access time during seek operations in disk drives. In particular, there is a need to improve VCM performance by increasing the torque constant of the VCM to achieve a corresponding decrease in data access time in seek operations in disk drives. It would also be desirable to increase the torque constant of the VCM to permit a reduction in VCM coil current to reduce $I^2R$ power losses in the system while still maintaining a given torque in the VCM.

SUMMARY OF THE INVENTION

The present invention can be regarded as a disk drive connectable to a power supply having a fixed DC voltage. The disk drive includes a voice coil motor (VCM) having a coil, a spindle motor having a plurality of windings, and a rotor rotatable at a variable spin-rate, the rotor having permanent magnets. The disk drive includes a fixed DC voltage power conductor for receiving and conducting the fixed DC voltage. A spindle motor driver is coupled to the fixed DC voltage power conductor and at least one of the windings for controlling the spin-rate of the rotor. The permanent magnets induce an AC voltage across the windings while the rotor is rotating. A rectifier circuit is coupled to at least one of the windings for rectifying the AC voltage across the at least one winding to produce a rectified DC voltage. A first switch means is coupled to the rectifier circuit for providing the rectified DC voltage to a first node. A second switch means is coupled between the fixed DC voltage power conductor and the first node for providing the fixed DC voltage to the first node.

The first node has a first node DC voltage that is determined by the rectified DC voltage provided by the first switch means and the fixed DC voltage provided by the second switch means. The first node DC voltage is greater than the fixed DC voltage during a track seeking operation in the disk drive. A VCM driver includes switching elements coupled to the first node and the VCM for providing the first node DC voltage across the coil of the VCM.

The invention can also be regarded as a method of providing increased voltage to a voice coil motor in a disk drive having a spindle motor including a plurality of windings and a rotor rotatable at a variable spin-rate. The disk drive is connectable to a power supply having a fixed DC voltage. The method includes the steps of (1) providing the fixed DC voltage to at least one of the windings to control the spin-rate of the rotor, (2) inducing an AC voltage across the windings while the rotor is rotating, and (3) rectifying the AC voltage across at least one of the windings to produce a rectified DC voltage. The method further includes providing the rectified DC voltage to a first node with a first switch, and providing the fixed DC voltage to the first node with a diode. The first node has a first node DC voltage that is determined by the rectified DC voltage provided by the first switch and the fixed DC voltage provided by the diode. The first node DC voltage is greater than the fixed DC voltage during a track seeking operation in the disk drive. The method includes providing the first node DC voltage to the voice coil motor.

DESCRIPTION OF THE PREFERRED EMBODIMENTS

Figure 1:
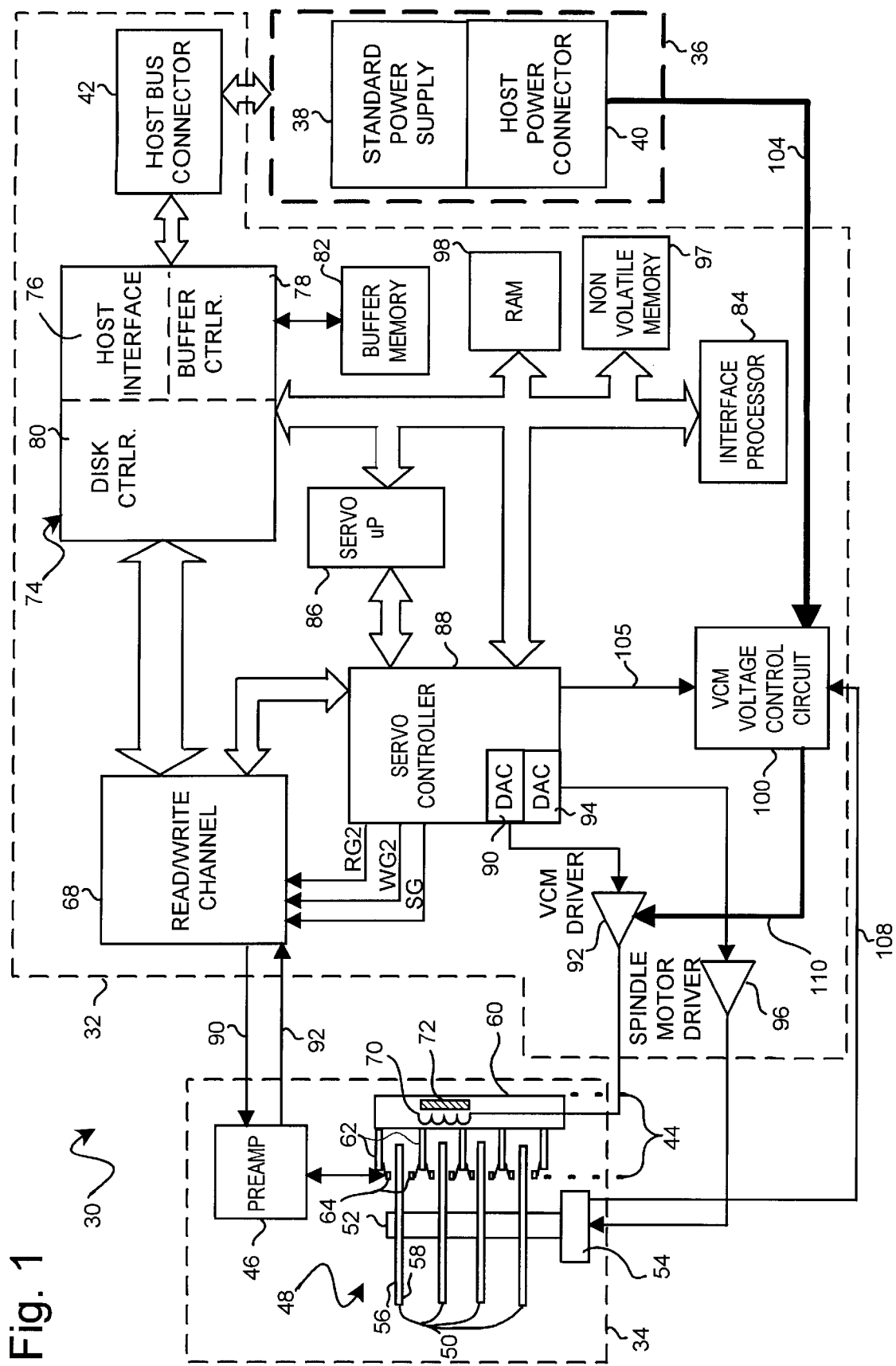
FIG. 1 is a block diagram of a hard disk drive of the invention and a corresponding host system power supply.

A hard disk drive according to the present invention is illustrated generally at 30 in FIG. 1. Disk drive 30 includes a disk controller circuit board 32 and a head disk assembly (HDA) 34. Disk controller circuit board 32 includes circuitry and processors which provide an intelligent disk control system interface between a host system 36 and HDA 34 for execution of read and write commands. Host system 36 can include a microprocessor based data processing system such as a personal computer, or other system capable of performing a sequence of logical operations. Host system 36 includes a standard power supply 38 which supplies power to disk controller circuit board 32 via a power supply connector 40. Data is transmitted between host system 36 and disk controller circuit board 32 via a host bus connector 42.

HDA 34 includes an actuator assembly 44, a preamplifier 46, and a disk assembly 48. Disk assembly 48 includes a plurality of magnetic media disks, such as indicated at 50. Disks 50 are stacked on a spindle assembly 52. Spindle assembly 52 is mechanically coupled to a spindle motor 54 for rotating disks 50 at a high rate of speed. Each disk 50 includes two disk surfaces capable of storing data thereon, such as indicated at 56 and 58. Actuator assembly 44 includes a voice coil motor (VCM) 60 and actuator arms 62 extending from VCM 60. Each actuator arm 62 corresponds to a respective disk surface such as 56 or 58. A transducer head 64 is disposed at the end of each actuator arm 62, and each transducer head 64 is associated with a disk surface 56 or 58. Transducer heads 64 communicate with disk controller circuit board 32 via preamplifier 46 for reading and writing data to the transducer head's associated disk surface. Preamplifier 46 is electrically coupled to transducer head 64 for receipt and amplification of position signals representative of the position of transducer head 64. Preamplifier 46 provides an amplified signal to a read/write channel 68 of disk controller circuit board 32. Read/write channel 68 performs encoding and decoding of data written to and read from disks 50.

VCM 60 includes a coil 70 moving in proximity to a permanent magnet 72. Actuator arms 62 are permanently coupled to VCM 60. VCM 60 swings actuator arms 62 and their corresponding transducer heads 64 back and forth over their associated disk surfaces 56 or 58 to access target data tracks formed on the associated disk surface.

Disk control circuit board 32 includes a host interface and disk controller (HIDC) integrated circuit 74. HIDC 74 includes a host interface 76, a buffer controller 78, and a disk controller 80. Host interface 76 communicates with host system 36 via host bus connector 42 by receiving commands and data from and transmitting status and data back to host system 36. Buffer controller 78 controls a buffer memory 82 employed for storing data from host system 36 which is to be written to disks 50. In addition, buffer controller 78 controls buffer memory 82 for storing read data from disks 50 to be transmitted to host system 36 via host interface 76. Buffer memory 82 typically comprises random access memory (RAM), such as dynamic random access memory (DRAM).

Disk controller 80 sends data to and receives data from read/write channel 68. Disk controller 80 also provides for error correction and error detection on data transmitted to or read from disk 50.

An interface processor 84 handles the flow of data and commands received by host interface 76 by sending commands to and reading status from disk controller 80. Interface processor 84 ascertains which commands to process from host system 36 and when to process these commands, and directs other tasks performed by disk controller 80.

A servo processor 86 commands a servo controller 88 to control the position of transducer head 64 over disk 50 at a target data track for subsequent execution of read or write commands. Servo processor 86 receives a representative form of the position signals sensed by transducer head 64 and amplified by preamplifier 46 via read/write channel 68 and servo controller 88 and performs calculations to position transducer head 64 relative to its associated disk surface. Servo processor 86 commands a digital to analog converter (DAC) 90 in servo controller 88 to provide a corresponding analog signal to a VCM driver 92. VCM driver 92 responds to the analog signal from DAC 90 to provide a corresponding current to VCM 60. More specifically, the current from VCM driver 92 is provided to coil 70 of VCM 60 and causes movement of coil 70 which in turn causes attached actuator arm 62 to swing and thereby move transducer head 64 over an associated disk surface 56 or 58 to access target data tracks.

Servo processor 86 also provides commands to servo controller 88 to control the rotational velocity of spindle motor 54. A DAC 94 in servo controller 88 provides an analog signal to a spindle motor driver 96. Spindle motor driver 96 responds to the analog signal from DAC 94 to drive and thereby control the speed of spindle motor 54. Spindle motor driver 96 also detects a back EMF of spindle motor 54 and provides a signal representative of the spin-rate of spindle motor 54 to servo controller 88 which converts the signal into a monitored velocity signal which can be read by servo processor 86. In this way, servo processor 86 can control the spin-rate of spindle motor 54 via servo controller 88 to maintain a substantially constant spin-rate of rotating disks 50.

Disk system operational programs are stored in non-volatile memory 97, such as read-only memory (ROM) or flash memory, and can be all or partially loaded into RAM 98 for execution from RAM 98 or both RAM 98 and non-volatile memory 97. Alternatively, portions of disk system operational programs are stored on reserve cylinders on disk 50. Suitably, servo processor 86 may have integrated or separate memory (not shown) for storage of servo programs.

The current track position of transducer head 64 is stored by servo processor 86 to determine a required seek distance between the current data track and a target data track. Based on the required seek distance, servo processor 86 retrieves a corresponding read or write seek profile and provides a digital signal command to DAC 90 corresponding to the seek profile. The profile determines the performance of a seek operation and is highly dependent on the VCM dynamics, i.e. torque constant $K_t$ and applied current $I_{coil}$ discussed above. DAC 90 provides a corresponding analog signal to VCM driver 92 representative of the seek profiles. VCM driver 92 provides a current output to coil 70 of VCM 60 for acceleration and/or deceleration of actuator arm 62 to perform a seek operation to move transducer head 64 from the current data track to the target data track. As actuator arm 62 moves from the current data track to the target data track, position information is received through the sensing of servo wedges disposed on disk surface 56 or 58. Based on this position information, a position error signal is provided via preamplifier 46, read/write channel 68, and servo controller 88 to servo processor 86 to provide a representative position of transducer head 64 relative to its associated disk surface 56 or 58. Upon completion of a seek operation and the corresponding alignment of transducer head 64 over the target data track, a read or write command is executed to read data from or write data to the target data track.

VCM Voltage Control Circuitry for Providing Boosted VCM Voltage

According to the present invention, hard disk drive 30 includes a VCM voltage control circuit 100. VCM voltage control circuit 100 receives a regulated 12 volt DC power source on a fixed DC voltage power conductor 104 from standard power supply 38 of host system 36 via power supply connector 40. VCM voltage control circuit 100 receives a 24 volt AC power source on a AC voltage power conductor 108. The 24 volt AC power source is generated from the Bemf of spindle motor 54. VCM voltage control circuit 100 supplies boosted (increased) DC voltage power on a power line 110 during track seek operations and 12 volt DC power during track following operations to VCM driver 92 which drives VCM 60. VCM voltage control circuit 100 supplies power independently of VCM 60. In other words, the Bemf generated in VCM 60 is not employed by VCM voltage control circuit 100.

VCM voltage control circuit 100 provides an increased voltage to VCM 60 via VCM driver 92 at least during seek operations. In one embodiment, VCM voltage control circuit 100 is controlled by servo controller 88 via a line 105 to store 24 volts generated from the Bemf of spindle motor 54 in a capacitor (shown in FIG. 3) during track following operations and to provide the 24 volt power source as the VCM power source on line 110 during track seek operations. This increased voltage to VCM 60 significantly reduces access time during track seek operations in disk drive 30 as compared to a conventional disk drive without VCM voltage control circuit 100.

The access time in disk drive 30 is reduced because the boosted DC voltage from VCM voltage control circuit 100 during seek operations permits a higher torque constant to be used in VCM 60 than can be used by a VCM receiving a standard 12 volt power supply. The increased torque constant of VCM 60 allows greater torque to be developed by VCM 60, which reduces access time by reducing seek time.

In addition, the increased torque constant in VCM 60 permitted as a direct result of the boosted voltage from VCM voltage control circuit 100 during seek operations can alleviate heat related breakdown of components of VCM 60 by not requiring as much current to pass through coil 70 to achieve an equivalent amount of torque in VCM 60. Additionally, a significant improvement in coil current rise time is obtained with boosted voltages to VCM 60. Moreover, switching time between the acceleration phase and the deceleration phase of the seek operation is also reduced by utilizing the boosted VCM voltages.

Figure 2:
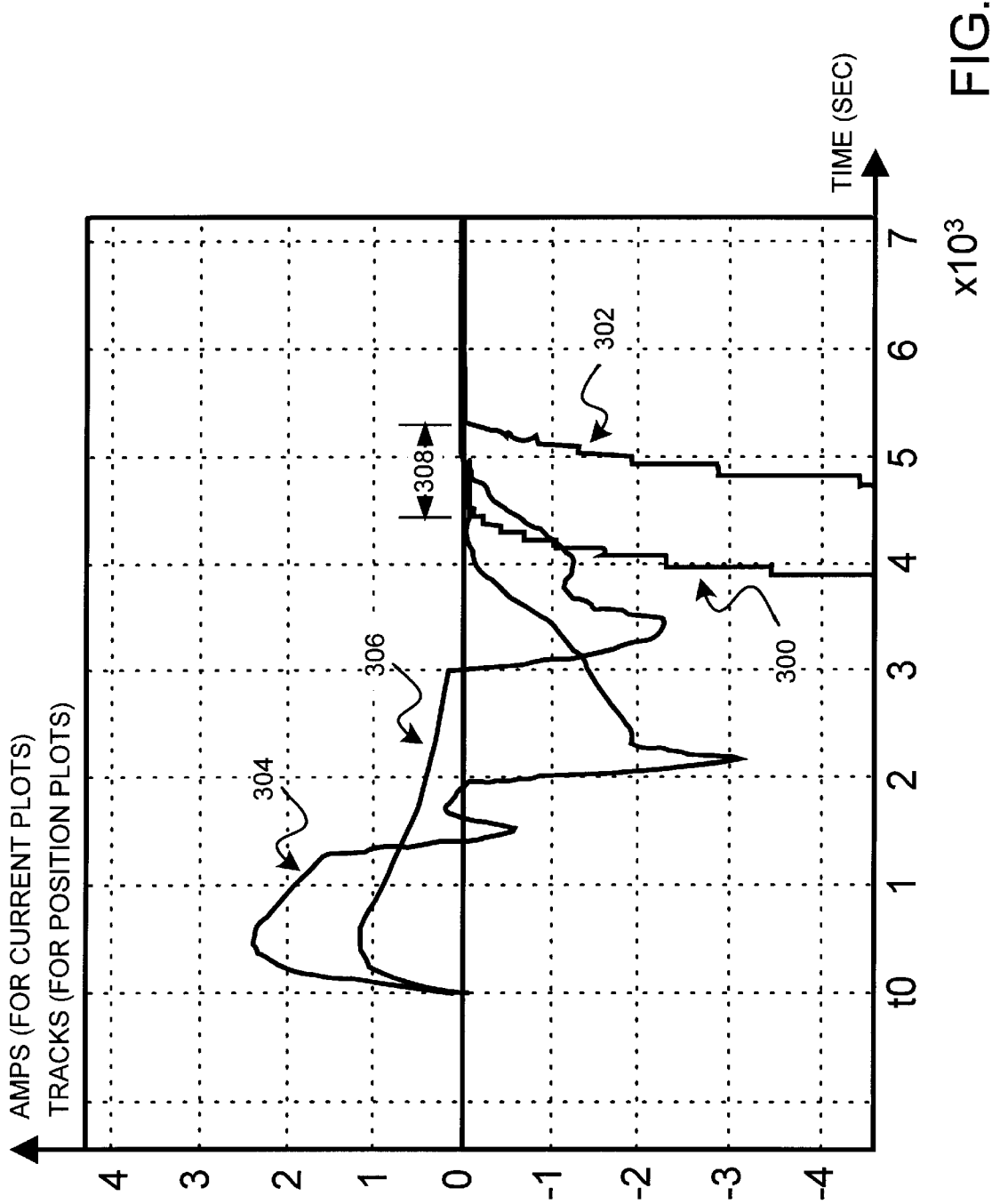
FIG. 2 is a graphical diagram illustrating track position and VCM coil current versus time for a 12 volt standard power supply and a 24 volt VCM power source according to the present invention.

Simulation results for a VCM using a 12 volt standard power supply and for using a 24 volt VCM power source according to the present invention from a somewhat idealized model of a seek operation in a disk drive are illustrated graphically in FIG. 2. FIG. 2 plots track position and VCM coil current versus time with a constant Kt for both cases of the motor. For reasons discussed above, a practical implementation would use a motor having increased Kt to provide improved torque without suffering heating effects from higher current. In the seek operation modeled in FIG. 2, a transducer head moves from a current data track to a target data track during a seek traversing approximately one-third of the actuator stroke.

A curve 300 plots track position directly preceding arrival at the target track for a VCM receiving the 24 volt VCM power source during the deceleration phase of the model seek operation. Comparably, a curve 302 plots track position preceding arrival at the target track for a VCM receiving the 12 volt standard power supply during the deceleration phase of the model seek operation. A curve 304 plots VCM coil current for the VCM receiving the 24 volt VCM power source during the model seek operation including acceleration and deceleration phases. A curve 306 comparably plots VCM coil current for the VCM receiving the 12 volt standard power supply during the model seek operation.

As illustrated in FIG. 2, the coil current rise time is significantly reduced by using the 24 volt VCM power source according to the present invention during the model seek operation instead of the 12 volt standard power supply. Also, as indicated by interval 308, there is an approximate 20 percent reduction in the total model seek time with the 24 volt VCM power source according to the present invention.

Figure 3:
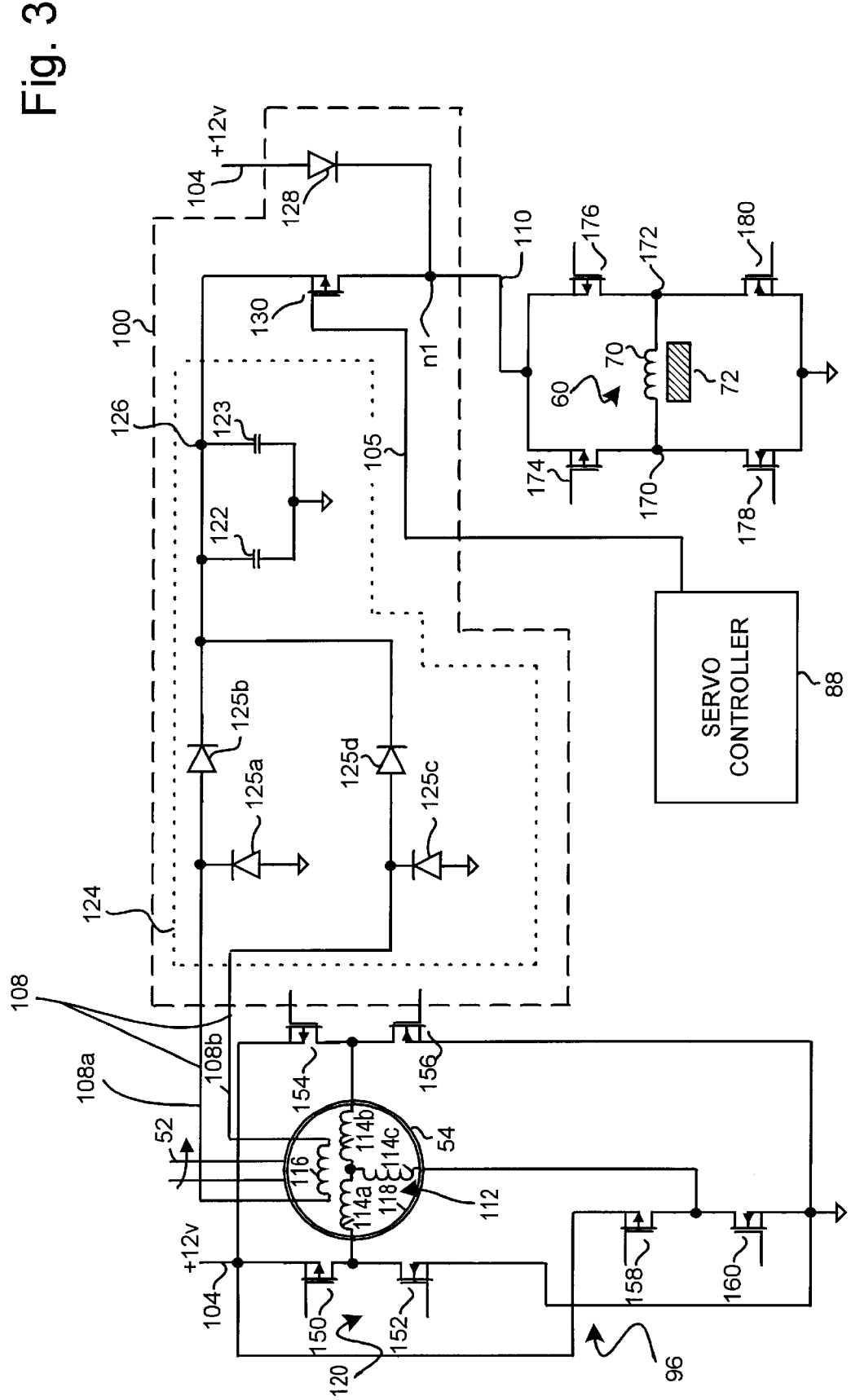
FIG. 3 is a schematic block diagram of a VCM voltage control circuit according to the present invention and its surrounding environment in the disk drive.

One embodiment of VCM voltage control circuitry 100 and its surrounding environment in disk drive 30 according to the present invention is illustrated in FIG. 3 in schematic and block diagram form. VCM voltage control circuitry 100 includes a capacitor 122 which stores a rectified voltage generated from the Bemf of spindle motor 54 during a track following operation in disk drive 30. The stored energy in capacitor 122 is used by VCM 60 during seek operations in disk drive 30. VCM control circuitry 100 utilizes the boosted voltage from capacitor 122 as described below to significantly reduce the voltage rise time in coil 70 of VCM 60. The increased voltage from capacitor 122 during seek operations significantly reduces the access time by reducing the seek time. Short seek operations have the most significant performance increase because the boosted VCM voltage is utilized for a significant percentage of a total short seek operation.

The embodiment of spindle motor 54 illustrated in FIG. 3 includes a stator 112 having three primary windings 114a, 114b, and 114c and a secondary winding 116, and a rotor 118. Rotor 118 has magnets that provide a permanent magnetic field. Spindle motor 54 generates torque ($T_d$) on rotor 118 when current ($I_m$) flows through at least one of primary windings 114. $T_d$ depends upon the magnitude and direction of current flow through primary windings 114, and the angular position of rotor 118 relative to stator 112. The functional relationship between torque and current flow and angular position is commonly depicted in a set of torque curves, each of which correspond to a respective one of a set of commutation states. Various firmware routines are stored in memory locations in non-volatile memory 97 for controlling the operation of spindle motor 54. Servo microprocessor 86 preferably comprises a digital signal processor that runs routines from non-volatile memory 97 to control spindle motor 54.

As illustrated in FIG. 3, one embodiment of spindle motor driver 96 includes switching elements 120, such as power FETs, for switching voltage on power line 104 to spindle motor 54. In the embodiment illustrated in FIG. 3, switching elements 120 include six FETs coupled in a conventional manner across primary windings 114 of spindle motor 54. The switching elements 120 are coupled to primary windings 114 as follows. A P-channel field effect transistor (P-FET) 150 is coupled between fixed DC voltage power conductor 104 and primary winding 114a. An N-channel field effect transistor (N-FET) 152 is coupled between the ground node and primary winding 114a. A P-FET 154 is coupled between fixed DC voltage power conductor 104 and primary winding 114b. A N-FET 156 is coupled between the ground node and primary winding 114b. A P-FET 158 is coupled between fixed DC voltage power conductor 104 and primary winding 114c. An N-FET 160 is coupled between the ground node and primary winding 114c.

Switching elements 120 (i.e., power FETs) are controllable to supply the fixed DC voltage (i.e., 12 volts) from fixed DC voltage power conductor 104 across primary windings 114. The voltage across selected ones of primary windings 114 cause current to flow through primary windings 114 to control the spin rate of rotor 118 of spindle motor 54.

In one exemplary embodiment of disk drive 30, a commutation state sequencer (not shown) of spindle motor driver 96 operates in a bipolar mode to control the turning on of two power FETs of switching elements 120 on opposite legs of primary windings 114 during each of the commutation run states so that current flows through two of the windings. For example, P-FET 150 and N-FET 160 are turned on during one of the commutation run states so that current flows from primary winding 114a to primary winding 114c. In this example commutation run state, P-FET 154 and N-FET 156 coupled to primary winding 114b are shut off so that no current flows through primary winding 114b, resulting in a floating winding. Thus, there is one floating winding for three-phase spindle motor 50 during each of the six commutation run states.

While rotor 118 of spindle motor 54 is rotating, the permanent magnets of rotor 118 induce an AC voltage across secondary winding 116. The induced AC voltage across secondary winding 116 is induced as a result of a direct Bemf voltage induced by the permanent magnets of rotor 118 rotating past secondary winding 116. In one embodiment, the fixed voltage power conductor 104 carries 12 volts and the directly induced Bemf voltage in secondary winding 116 produces 24 volts across secondary winding 116. The induced AC voltage across secondary winding 116 is provided on two line AC voltage power conductor 108.

A rectifier circuit 124 receives the AC voltage across secondary winding 116 provided on AC voltage power conductor 108. Rectifier circuit 124 rectifies the AC voltage on power conductor 108 to provide a rectified DC voltage (i.e., 24 volts) on a boosted voltage node 126 which is greater than the fixed DC voltage (i.e., 12 volts). Rectifier circuit 124 includes capacitor 122 coupled between boosted voltage node 126 and the ground node. Capacitor 122 filters and stores the rectified DC voltage produced by rectifier circuit 124 on boosted voltage node 126. A suitable value for capacitor 122 is approximately 470 microfarads.

Power conductor 108 includes power lines 108a and 108b. Rectifier circuit 124 includes a diode 125a coupled between power line 108a and ground and a diode 125c coupled between power line 108b and ground. In addition, rectifier circuit 124 includes a diode 125b coupled between power line 108a and boosted voltage node 126 and a diode 125d coupled between power line 108b and boosted voltage node 126. Diodes 125a–d operate in a conventional manner to provide full wave rectification of the AC voltage on power lines 108a and 108b. Capacitor 122 filters and stores the full wave rectified DC voltage provided on boosted voltage node 126 from diodes 125a–d. A capacitor 123 is coupled parallel to capacitor 122 between boosted voltage node 126 and ground to provide high frequency filtering of the 24 volt rectified voltage on boosted voltage node 126. A suitable value for capacitor 123 is approximately 0.1 microfarads.

A diode 128 is coupled between fixed DC voltage power conductor 104 and VCM voltage supply line 110. For example, in one embodiment, fixed DC voltage power conductor 104 is connected to standard 12 volt power supply 38 of host system 36 via host power conductor 40 and capacitor 122 stores a maximum rectified voltage of 24 volts on boosted voltage node 126.

A P-FET 130 is coupled between boosted voltage node 126 and VCM voltage supply line 110. Servo controller 88 provides a control signal 105 to the control gate of P-FET 130. The control signal on line 105 is at a high logic level while disk drive 30 is performing a track following operation, which turns off P-FET 130. The control signal on line 105 is at a low logic level while disk drive 30 is performing a track seeking operation which turns on P-FET 130 to couple the rectified voltage from boosted voltage node 126 to VCM voltage supply line 110.

As illustrated in FIG. 3, one embodiment of VCM driver 92 includes four FETs coupled in a conventional H-Bridge construction across coil 70 of VCM 60. VCM coil 70 is coupled to the H-Bridge FETs of VCM driver 92 between a node 170 and a node 172. The H-Bridge FET construction of VCM driver 92 includes a P-FET 174 coupled between VCM voltage supply line 110 and node 170 and a P-FET 176 coupled between VCM voltage supply line 110 and node 172. The H-Bridge FET construction of VCM driver 92 also includes an N-FET 178 coupled between the ground node and node 170 and an N-FET 180 coupled between the ground node and node 172.

The FETs of VCM driver 92 are controlled such that P-FET 174 and N-FET 180 are turned on while P-FET 176 and N-FET 178 are off to thereby apply the voltage on VCM voltage supply line 110 to node 170 and to ground node 172. Similarly, while P-FET 176 and N-FET 178 are turned on, P-FET 174 and N-FET 180 are off to thereby apply the voltage at VCM voltage supply line 110 to node 172 and to ground node 170. By switching selectively between the above two states current flows through VCM coil 70 to cause movement of coil 70 which in turn causes attached actuator arm 62 to swing and thereby move transducer head 64 over an associated disk surface 56 or 58 to access target data tracks.

Thus, VCM voltage supply line 110 supplies its voltage to VCM driver 92 which is provided across VCM coil 70. The operation of VCM voltage control circuitry 100 to control the voltage of the VCM voltage supply line 110 is as follows. When VCM voltage supply line 110 is less than or equal to 12 volts, diode 128 conducts and thereby provides the 12 volts from fixed DC voltage power conductor 104 to VCM voltage supply line 110. During a track following operation, the control signal on line 105 from servo controller 88 is at a high logic level which turns off P-FET 130 to de-couple the rectified voltage at boosted voltage node 126 from VCM voltage supply line 110 to permit the rectified voltage at boosted voltage node 126 to fully charge capacitor 122. For example, the Bemf induced AC voltage signal across secondary winding 116 from a 8 pole, three phase spindle motor 54 running at 10 Krpm cycles at a 4 Khz rate. Thus, the full wave rectified signal at boosted voltage node 126 is twice the 4 Khz rate or 8 Khz. The 8 Khz rate translates to a time period of 0.125 msec. This time period is sufficiently fast to permit recharging of capacitor 122 during track following with P-FET 130 off During a track seeking operation, control signal on line 105 from servo controller 88 is at a low logic level, which turns on P-FET 130 to couple the rectified voltage at boosted voltage node 126 to VCM voltage supply line 110. The stored value of capacitor 122 is approximately 24 volts to bring VCM voltage supply line 110 to approximately 24 volts. When the voltage of VCM voltage supply line 110 is greater than the voltage (i.e., 12 volts) of the fixed DC voltage power conductor 104, diode 128 shuts off. Therefore, when VCM voltage supply line 110 is raised to 24 volts, diode 128 shuts off. During a track seeking operation, capacitor 122 eventually discharges if the seek operation is long enough and VCM voltage supply line 110 is brought down to approximately 12 volts. When VCM voltage supply line 110 is no longer greater than the 12 volts of the fixed DC voltage power conductor 104, diode 128 conducts to provide the 12 volts from the fixed DC voltage power conductor to VCM voltage supply line 110.

Increased VCM Voltage

As explained above, the torque developed by VCM 60 can be increased as a result of increasing the VCM voltage during seek operations. The increased VCM torque reduces seek times by increasing the acceleration rate of the VCM during seek operations. The following discussion, equations, and examples illustrate (1) how the increased VCM voltage can reduce a seek time during a seek operation and (2) the discharge rate of capacitor 122 and the energy required to move the actuator assembly during the seek operation.

The acceleration rate (a) of VCM 60 is estimated by the following Equations II:

Equations II $$a = d\omega/dt = \dot{\omega} = (Kt/J)I_{coil}$$

$$I_{coil} = (V_{source} - \omega * Kt)/R_t$$

where:
 a is the acceleration rate of the VCM;
 $\omega$ is angular velocity of the transducer head;
 Kt is the torque constant of the VCM;
 J is the moment of inertia of the actuator assembly (i.e., load);
 $I_{coil}$ is the VCM coil current;
 $V_{source}$ is the voltage of the VCM power source supplying power to the VCM;
 $R_t$ is the total resistance of the VCM coil and power FETs driving the VCM coil from the VCM power source to ground; and
 Equations II neglect the effect of inductance.

The following Equations III–V approximate seek time ($t_{seek}$) as follows:
By integrating a=d$\omega$/dt=constant from Equations II:
Equations III $$\omega(t) = a * t_{seek} + \omega(0)$$

$$\omega(t) = a * t_{seek}, \text{ if } \omega(0) = 0$$

where:
 Acceleration rate (a) is assumed to be constant during the acceleration portion and the deceleration portion of a seek operation; and
 $t_{seek}$ is the seek time to move the transducer head from a current data track to a target data track, but not including the settling time.

By integrating $\omega(t) = a * t_{seek}$ from Equations III:

$$\theta(t) = \frac{1}{2} * a * t_{seek}^2 \qquad \text{Equation IV}$$

Solving Equation IV for t:

$$t_{seek} = \sqrt{\frac{2 * \theta_{seek}}{a}} \qquad \text{Equations V}$$

$$= \frac{\sqrt{2 * \theta_{seek}}}{\sqrt{a}}$$

$$= \frac{CONSTANT}{\sqrt{a}}$$

where:
 $\theta_{seek}$ is the seek length arc or the angular displacement the transducer head moves during the seek.

As can be shown by Equations II above, the acceleration rate (a) is proportional to $V_{source}$, such that a doubling Of $V_{source}$ produces approximately a doubling of acceleration rate (a). By Equations V, a doubling of acceleration rate (a), reduces seek time ($t_{seek}$) by:

$$\frac{t_{seek2}}{t_{seek1}} = t_{seek2} * \frac{1}{t_{seek1}}$$

$$= \frac{CONSTANT}{\sqrt{2a}} * \frac{\sqrt{a}}{CONSTANT}$$

$$= \frac{1}{\sqrt{2}} = 0.707 \approx 30\%.$$

Thus, if the torque constant (Kt), the moment of inertia (J), an d the Rt are fixed, and $V_{source}$ to the VCM is doubled, then the acceleration rate (a) approximately doubles, which reduces the seek time ($t_{seek}$) by approximately 30%.

The energy ($E_{old}$) required to move the actuator assembly to thereby move the transducer head from a current data track to a target data track during a seek traversing approximately one-third of the actuator stroke with a 12 volt power source is approximately given by the following Equations VI:

Equations VI:

$$E_{old} = V_{source(old)} * I_{seek(old)} * t_{seek(old)}$$

$$= 12V * 0.53A * 4.1 \text{ msec}$$

$$= 26.1 \text{ mJ}$$

where:
 The 0.53A and 4.1 msec values are example values taken from empirical simulations for a 12 volt VCM power supply.

The energy ($E_{new}$) required to move the actuator assembly to thereby move the transducer head from a current data track to a target data track during a seek traversing approximately one-third of the actuator stroke with a 24 volt power source is approximately given by the following Equation VII:

$$E_{new} = V_{source(new)} * I_{seek(new)} * t_{seek(new)} \quad \text{Equations VII}$$

$$= V_{source(new)} * \left(\frac{V_{source(new)}}{R_t}\right) * t_{seek(new)}$$

$$= 2 * V_{source\,old} * \left(\frac{2 * V_{source(old)}}{R_t}\right) * 0.7(t_{seek(old)})$$

$$= 2.8 * E_{old} = 2.8 * (26.1) = 73.1 \text{ mJ}$$

The energy to perform the seek operation is drawn from boost capacitor 122. The energy ($E_c$) stored in capacitor 122 available for use during the seek operation is approximately given by the following Equation VIII:

$$E_c = \frac{1}{2} * C * V_I^2 - \frac{1}{2} * C * V_F^2 \quad \text{Equation VIII}$$

$$= \frac{1}{2} * 470 \ \mu F * 24^2 - \frac{1}{2} * 470 \ \mu F * 12^2$$

$$= 135.4 \text{ mJ} - 33.8 \text{ mJ} = 101.6 \text{ mJ}$$

The discharge time (dt) of capacitor 122 during the seek operation is approximately given by the following Equation IX:

$$dt = \frac{C * dV}{I_{AveSeek}} \quad \text{Equation IX}$$

$$= \frac{470 \ \mu F * 12}{1.06 \text{ A}} = 5.32 \text{ mSec}$$

According to Equation IX above, the energy ($E_c$) from capacitor 122 consumed during the one-third stroke seek operation will not deplete the charge on capacitor 122 down to 12 volts, because the seek time ($t_{seek}$) is between 4.1 mSec (seek time from simulation results for 12 volt VCM power source) and 2.9 mSec (seek time for 24 volt VCM power source, which is approximately 0.707×4.1 mSec as shown above) and boost capacitor 122 takes approximately 5.32 mSec to discharge from 24 volts to 12 volts.

Disk drive 30 utilizes the Bemf of spindle motor 54 to store a boosted voltage in a capacitor (such as capacitor 122) during track following operations so that the stored energy of capacitor 122 can be employed during track seeking operations to increase the voltage to VCM 60. The increased VCM voltage permits the torque constant of VCM 60 to be increased to allow greater torque to be developed by VCM 60 resulting in reduced data access times during seek operations. The increased VCM voltage advantageously permits the torque constant of VCM 60 to be increased while allowing for a corresponding reduction in VCM coil current to reduce I²R power losses in disk drive 30 while still maintaining a given torque in VCM 60.

We claim:

1. A disk drive connectable to a power supply having a fixed DC voltage, the disk drive comprising:

a voice coil motor (VCM) having a coil;

a spindle motor having a plurality of windings and a rotor rotatable at a variable spin-rate, the rotor having permanent magnets;

a fixed DC voltage power conductor for receiving and conducting the fixed DC voltage;

a spindle motor driver coupled to the fixed DC voltage power conductor and at least one of the windings;

a spindle motor controller for commanding the spindle motor driver to selectively apply the fixed DC voltage to the at least one of the windings to control the spin-rate of the rotor;

the permanent magnets inducing an AC voltage across the windings while the rotor is rotating;

a rectifier circuit coupled to at least one of the windings for rectifying the AC voltage across the at least one winding to produce a rectified DC voltage;

a first node;

first means coupled between the rectifier circuit and the first node for selectively providing the rectified DC voltage to the first node;

second means coupled between the fixed DC voltage power conductor and the first node for selectively providing the fixed DC voltage to the first node;

the first node having a first node DC voltage that is determined by the rectified DC voltage provided by the first means and the fixed DC voltage provided by the second means, the first node DC voltage being greater than the fixed DC voltage during a track seeking operation in the disk drive while the fixed DC voltage is being provided from the power supply; and a VCM driver having switching elements coupled to the first node and the VCM for selectively providing the first node DC voltage across the coil of the VCM.

2. The disk drive of claim 1 wherein the first means includes a first control gate, and the disk drive further comprises:

a controller for providing a control signal to the first control gate, wherein the control signal is at a first level while the disk drive is performing a track following operation and at a second level while the disk drive is performing the track seeking operation; and wherein the first means turns off in response to the control signal being at the first level and turns on in response to the control signal being at the second level.

3. The disk drive of claim 1 wherein the second means comprises a diode which provides the fixed DC voltage to the first node but de-couples the first node from the fixed DC voltage power conductor while the first node DC voltage is greater than the fixed DC voltage.

4. The disk drive of claim 1 wherein:

the plurality of windings includes a plurality of primary windings and a secondary winding;

the spindle motor driver is coupled to the fixed DC voltage power conductor and the primary windings; and the rectifier circuit is coupled to the secondary winding.

5. The disk drive of claim 1 wherein the rectified DC voltage is greater than the fixed DC voltage.

6. The disk drive of claim 1 wherein the rectifier circuit includes a capacitor for filtering and storing the rectified DC voltage.

7. The disk drive of claim 6 wherein the rectifier circuit further includes a second capacitor for filtering high frequency components of the rectified DC voltage.

8. The disk drive of claim 1 wherein the rectifier circuit produces a full-wave rectified DC voltage greater than the fixed DC voltage.

9. A method of providing increased voltage to a voice coil motor in a disk drive having a spindle motor including a plurality of windings and a rotor rotatable at a variable spin-rate, wherein the disk drive is connectable to a power supply having a fixed DC voltage, the method comprising the steps of:

selectively providing the fixed DC voltage to at least one of the windings to control the spin-rate of the rotor;

inducing an AC voltage across the windings while the rotor is rotating;

rectifying the AC voltage across at least one of the windings to produce a rectified DC voltage;

providing the rectified DC voltage to a first node with a first switch;

providing the fixed DC voltage to the first node with a diode, wherein the first node has a first node DC voltage that is determined by the rectified DC voltage provided by the first switch and the fixed DC voltage provided by the diode, the first node DC voltage being greater than the fixed DC voltage during a track seeking operation in the disk drive while the fixed DC voltage is being provided from the power supply; and providing the first node DC voltage to the voice coil motor.

10. The method of claim 9 wherein the plurality of windings includes a plurality of primary windings and a secondary winding, the method includes:

providing the fixed DC voltage to the primary windings; and rectifying the AC voltage across the secondary winding.

11. The method of claim 9 wherein the rectified DC voltage is greater than the fixed DC voltage.

12. The method of claim 9 wherein the rectifying step includes the steps of filtering and storing the rectified DC voltage.

13. The method of claim 9 wherein the first switch includes a first control gate, and the method further comprises the steps of:

providing a control signal to the first control gate, wherein the control signal is at a first level while the disk drive is performing a track following operation and at a second level while the disk drive is performing the track seeking operation; and turning the first switch off in response to the control signal being at the first level and turning the first switch on in response to the control signal being at the second level.

14. The method of claim 9 further comprising the step of de-coupling the first node from the fixed DC voltage with the diode while the first node DC voltage is greater than the fixed DC voltage.

15. The method of claim 9 wherein the rectifying step includes the step of producing a full-wave rectified DC voltage greater than the fixed DC voltage.

* * * * *